(12) United States Patent
Horiike et al.

(10) Patent No.: US 11,590,511 B2
(45) Date of Patent: Feb. 28, 2023

(54) FLOW-TYPE FIELD-FLOW FRACTIONATION APPARATUS

(71) Applicant: SHIMADZU CORPORATION, Kyoto (JP)

(72) Inventors: Shigeyoshi Horiike, Kyoto (JP); Yukio Oikawa, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 17/259,257

(22) PCT Filed: Jul. 3, 2019

(86) PCT No.: PCT/JP2019/026421
§ 371 (c)(1),
(2) Date: Jan. 11, 2021

(87) PCT Pub. No.: WO2020/022006
PCT Pub. Date: Jan. 30, 2020

(65) Prior Publication Data
US 2021/0268514 A1 Sep. 2, 2021

(30) Foreign Application Priority Data
Jul. 26, 2018 (JP) .............................. JP2018-140074

(51) Int. Cl.
*B03B 5/62* (2006.01)
*B03B 1/02* (2006.01)
*G01N 15/02* (2006.01)

(52) U.S. Cl.
CPC ................. *B03B 5/62* (2013.01); *B03B 1/02* (2013.01); *G01N 15/0272* (2013.01); *G01N 2015/0288* (2013.01)

(58) Field of Classification Search
CPC ........ B03B 5/62; B03B 1/02; G01N 15/0255; G01N 15/0272; G01N 30/0005;
(Continued)

(56) References Cited

U.S. PATENT DOCUMENTS

| 5,039,614 A | 8/1991 | Dekmezian et al. |
| 5,193,688 A * | 3/1993 | Giddings ........... G01N 30/0005 209/127.1 |

(Continued)

FOREIGN PATENT DOCUMENTS

| EP | 1 879 025 A1 | 1/2008 |
| JP | 2005-291921 A | 10/2005 |
| JP | 2008-000724 A | 1/2008 |

OTHER PUBLICATIONS

Office Action dated Jan. 28, 2022 in Chinese Application No. 201980042472.4.
(Continued)

*Primary Examiner* — Michael McCullough
*Assistant Examiner* — Kalyanavenkateshware Kumar
(74) *Attorney, Agent, or Firm* — Sughrue Mion, PLLC

(57) ABSTRACT

A flow-type field-flow fractionation apparatus 1 includes a first heater 14 and a second heater 16. The first heater 14 heats a carrier fluid between a first pump 12 and a separation cell 3. The second heater 16 heats a focus fluid between a second pump 15 and the separation cell 3. Thus, the carrier fluid heated by the first heater 14 is sent by the first pump 12 and flows into the separation cell 3, and the focus fluid heated by the second heater 16 is sent by the second pump 15 and flows into the separation cell 3. This can stabilize temperatures of the carrier fluid and the focus fluid flowing into the separation cell 3. Then, when an analysis is per-
(Continued)

formed using the flow-type field-flow fractionation apparatus 1, the analysis can be performed with high reproducibility.

4 Claims, 7 Drawing Sheets

(58) Field of Classification Search
CPC ... G01N 2015/0288; G01N 2015/0053; G01N 2030/003
See application file for complete search history.

(56) References Cited

U.S. PATENT DOCUMENTS

| | | | |
|---|---|---|---|
| 6,109,119 A * | 8/2000 | Jiang | G01N 30/0005 73/864.33 |
| 2003/0223913 A1 * | 12/2003 | Karp | G01N 30/16 422/400 |
| 2005/0148064 A1 * | 7/2005 | Yamakawa | B01J 19/0093 435/288.5 |
| 2008/0003689 A1 | 1/2008 | Lee et al. | |
| 2010/0112576 A1 | 5/2010 | Patil | |

OTHER PUBLICATIONS

International Search Report for PCT/JP2019/026421 dated Sep. 17, 2019 [PCT/ISA/210].
Written Opinion for PCT/JP2019/026421 dated Sep. 17, 2019 [PCT/ISA/210].
Office Action dated Feb. 1, 2022 in Japanese Application No. 2020-532254.
Decision of Final Rejection dated Aug. 30, 2022, issued in Japanese Application No. 2020-532254.
Office Action dated Aug. 16, 2022, issued in Chinese Application No. 201980042472.4.
Communication dated Nov. 18, 2022 from The State Intellectual Property Office of P.R. of China in Application No. 201980042472.4.

* cited by examiner

FLOW-TYPE FIELD-FLOW FRACTIONATION APPARATUS

CROSS REFERENCE TO RELATED APPLICATIONS

This application is a National Stage of International Application No. PCT/JP2019/026421 filed Jul. 3, 2019, claiming priority based on Japanese Patent Application No. 2018-140074 filed Jul. 26, 2018.

TECHNICAL FIELD

The present invention relates to a flow-type field-flow fractionation apparatus including a separation cell that discharges a part of a carrier fluid as a cross flow from a flow passage to outside.

BACKGROUND ART

Conventionally, a so-called cross-flow flow-type field-flow fractionation apparatus using a cross flow has been used as a flow-type field-flow fractionation apparatus that separates fine particles included in a fluid. This cross-flow flow-type field-flow fractionation apparatus is provided with a separation cell (separation channel) in which a flow passage is formed.

In this flow-type field-flow fractionation apparatus, a sample in which fine particles to be separated are dispersed is introduced into a flow passage of the separation cell, and a carrier fluid is supplied to the flow passage of the separation cell at a predetermined flow rate. Then, while a part of the fluid flows out of the separation cell as a cross flow, the fine particles are separated inside the separation cell (see, for example, Patent Document 1).

In the separation cell in the flow-type field-flow fractionation apparatus described in Patent Document 1, a semipermeable membrane that allows the carrier fluid to pass through and does not allow fine particles to pass through is closely adhered to inside of a bottom wall in which a large number of openings are formed. When the carrier fluid is supplied to the flow passage of the separation cell, a flow of the carrier fluid passing through the semipermeable membrane and flowing out to outside the separation cell through the openings of the bottom wall (cross flow) is formed together with a flow of the carrier fluid passing through the flow passage. In the flow passage of the separation cell, a distribution of fine particles according to a particle size occurs due to a diffusion of fine particles and a force of the cross flow, and a distribution of flow rate occurs in which the flow rate differs depending on a position in a thickness direction of a layer. As a result, the fine particles sequentially flow out from an outflow port of the separation cell in accordance with the particle size. Then, the fine particles that have flowed out of the separation cell are detected by a detector.

PRIOR ART DOCUMENTS

Patent Documents

Patent Document 1: JP 2008-000724 A

SUMMARY OF THE INVENTION

Problems to be Solved by the Invention

When an analysis is performed using the conventional flow-type field-flow fractionation apparatus as described above, there is a problem that reproducibility of the analysis is low. In other words, the conventional flow-type field-flow fractionation apparatus has a problem that the same detection result may not be obtained even when the same sample and the same carrier fluid are used. Specifically, in the conventional flow-type field-flow fractionation apparatus, the distribution of fine particles and the distribution of flow rate that occur in the separation cell change in accordance with viscosity of the fluid. The viscosity of the fluid depends on a temperature (changes greatly depending on the temperature). Thus, when the temperature inside the separation cell changes, a peak representing the fine particles detected by the detector deviate significantly. For example, when the temperature inside the separation cell changes by 1° C., peak retention time tends to change by about 1%.

The present invention has been made in view of the above circumstances, and an object of the present invention is to provide a flow-type field-flow fractionation apparatus capable of stabilizing a temperature of a fluid in a separation cell.

Means for Solving the Problems (1) A flow-type field-flow fractionation apparatus of the present invention includes a separation cell, at least one pump, and at least one heater. The separation cell is provided inside with a flow passage for a fluid, the cell has a carrier inflow port allowing a carrier fluid to flow into the flow passage, a focus inflow port allowing a focus fluid to flow into the flow passage, an outflow port allowing the carrier fluid that has passed through the flow passage to flow out, and a plurality of openings allowing a part of the carrier fluid to discharge to outside as a cross flow. The at least one pump sends the carrier fluid and the focus fluid to the separation cell. The at least one heater heats the carrier fluid and the focus fluid between the at least one pump and the separation cell.

With this configuration, in the separation cell, fine particles included in the carrier fluid are collected at a part in the flow passage by the focus fluid, then the carrier fluid is passed to the outflow port, and in this process, a part of the carrier fluid is discharged from the plurality of openings to outside as a cross flow. At this time, the carrier fluid and the focus fluid heated by the heater are sent by the at least one pump and flow into the separation cell.

This can stabilize the temperatures of the carrier fluid and the focus fluid in the separation cell. Then, when an analysis is performed using the flow-type field-flow fractionation apparatus, the analysis can be performed with high reproducibility.

(2) Further, the at least one heater may be configured to heat the carrier fluid and the focus fluid to each set temperature.

This configuration allows the carrier fluid and the focus fluid maintained at a constant temperature to flow into the separation cell.

As a result, the temperature of the fluid in the separation cell can be further stabilized.

(3) Further, the flow-type field-flow fractionation apparatus may further include an oven. The oven houses the separation cell inside the oven and heats the separation cell.

In this configuration, heating the separation cell with the oven can stabilize the temperature of the separation cell.

This can stabilize the temperatures of the carrier fluid and the focus fluid in the separation cell.

(4) Further, the at least one heater may be configured to have a heating element. The heating element heats the carrier fluid and the focus fluid.

This configuration allows the carrier fluid and the focus fluid to be directly heated by the heating element included in the heater.

As a result, the temperatures of the carrier fluid and the focus fluid can be smoothly adjusted.

(5) Further, the at least one heater may be configured to have a heat transfer element. The heat transfer element transfers heat in the oven to the carrier fluid and the focus fluid.

This configuration allows the carrier fluid and the focus fluid to be heated by using the heat in the oven.

Effects of the Invention

In the present invention, the carrier fluid and the focus fluid heated by the heater are sent by the at least one pump and flow into the separation cell. This can stabilize the temperatures of the carrier fluid and the focus fluid in the separation cell. Then, when an analysis is performed using the flow-type field-flow fractionation apparatus, the analysis can be performed with high reproducibility.

MODE FOR CARRYING OUT THE INVENTION

1. Overall Configuration of Flow-Type Field-Flow Fractionation Apparatus

Figure 1:
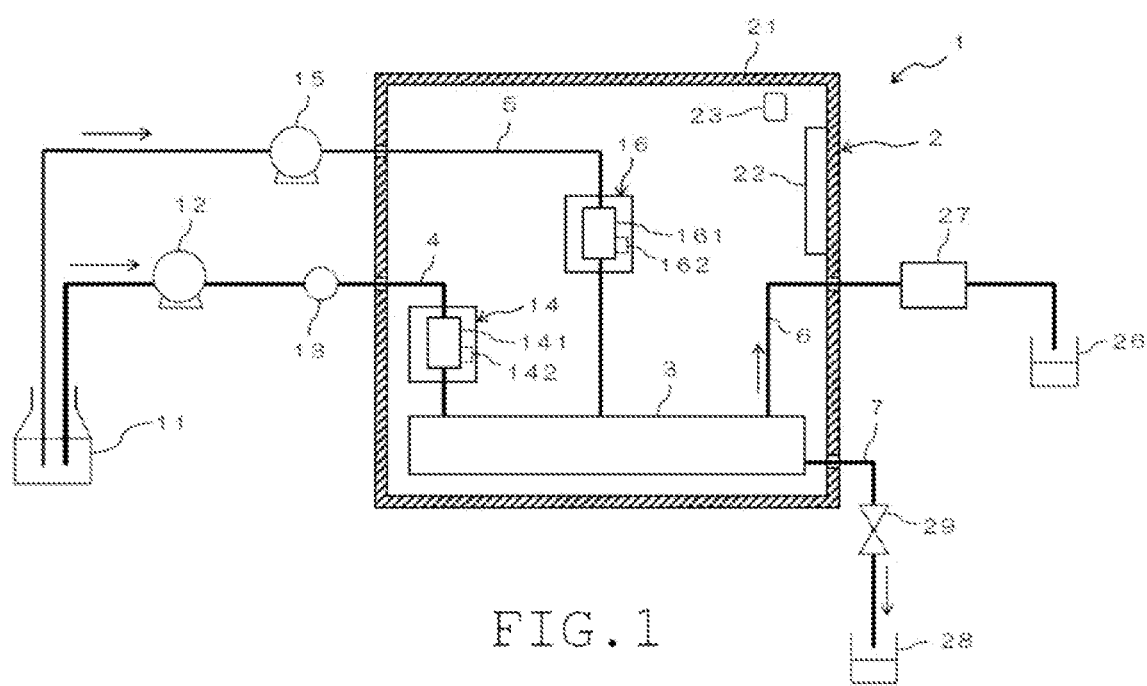
FIG. 1 is a schematic diagram showing a configuration example of a flow-type field-flow fractionation apparatus according to a first embodiment of the present invention.

FIG. 1 is a schematic diagram showing a configuration example of a flow-type field-flow fractionation apparatus 1 according to a first embodiment of the present invention.

The flow-type field-flow fractionation apparatus 1 includes an oven 2 and a separation cell 3.

The oven 2 is for heating a part of members in the flow-type field-flow fractionation apparatus 1, and includes a housing 21, an oven heater 22, and an oven temperature sensor 23.

The housing 21 has a hollow shape. The oven heater 22 is disposed in the housing 21. The oven temperature sensor 23 is a sensor for detecting a temperature inside the housing 21, and is disposed in the housing 21.

The separation cell 3 has an elongated shape and is housed in the oven 2 (in the housing 21). That is, the separation cell 3 is heated by heat from the oven heater 22 of the oven 2. As will be described in detail later, the separation cell 3 has a flow passage (first cell flow passage 51) inside the separation cell 3, and is configured to separate fine particles included in a carrier fluid in the passage.

Further, the flow-type field-flow fractionation apparatus 1 includes a carrier flow passage 4, a focus flow passage 5, an outflow passage 6, and a cross-flow discharge flow passage 7 as flow passages.

One end of the carrier flow passage 4 is connected to one end of the separation cell 3. An intermediate part of the carrier flow passage 4 is inserted into an opening formed in the housing 21 of the oven 2. A part of the carrier flow passage 4 is disposed in the housing 21 of the oven 2, and the remaining part is disposed outside the housing 21 of the oven 2. The focus flow passage 5, the outflow passage 6, and the cross-flow discharge flow passage 7 are inserted into openings formed in the housing 21 of the oven 2, and are partially inserted into the housing 21 of the oven 2, with the remaining parts disposed outside the housing 21 of the oven 2, similarly to the carrier flow passage 4.

A distal end (other end) of the carrier flow passage 4 is disposed in a fluid supply part 11. The fluid supply part 11 is disposed outside the oven 2, and a liquid (fluid) serving as a mobile phase is stored inside the oven 2. A first pump 12 and a sample introduction part 13 are disposed (interposed) in that order in a moving direction of the carrier fluid (mobile phase) in the intermediate part of the carrier flow passage 4 outside the oven 2. A first heater 14 is disposed (interposed) in the intermediate part of the carrier flow passage 4 inside the oven 2. Alternatively, the first heater 14 may be disposed in a part outside the oven 2.

The sample introduction part 13 is, for example, an autosampler.

The first heater 14 includes a first heating element 141 and a first temperature sensor 142. The first heating element 141 covers the intermediate part of the carrier flow passage 4. The first temperature sensor 142 is provided around the first heating element 141, and is configured to detect a temperature of the first heating element 141. As described above, the first heater 14 is configured to heat a part in the intermediate part of the carrier flow passage 4 between the separation cell 3 and the first pump 12.

One end of the focus flow passage 5 is connected to a central part of the separation cell 3. A distal end (other end) of the focus flow passage 5 is disposed in the fluid supply part 11. A second pump 15 is disposed (interposed) in an intermediate part of the focus flow passage 5 outside the oven 2. A second heater 16 is disposed (interposed) in the intermediate part of the focus flow passage 5 inside the oven 2. Alternatively, the second heater 16 may be disposed in a part outside the oven 2.

The second heater 16 includes a second heating element 161 and a second temperature sensor 162. The second heating element 161 covers the intermediate part of the focus flow passage 5. The second temperature sensor 162 is provided around the second heating element 161 and is configured to detect a temperature of the second heating element 161. As described above, the second heater 16 is configured to heat a part in the intermediate part of the focus flow passage 5 between the separation cell 3 and the second pump 15.

One end of the outflow passage 6 is connected to the other end of the separation cell 3. A distal end (other end) of the outflow passage 6 is disposed inside a drain 26 disposed outside the oven 2. A detector 27 is disposed (interposed) in an intermediate part of the outflow passage 6 outside the oven 2.

One end of the cross-flow discharge flow passage 7 is connected to a lower end of the separation cell 3. A distal end (other end) of the cross-flow discharge flow passage 7 is disposed inside a drain 28 disposed outside the oven 2. A valve 29 is disposed (interposed) in an intermediate part of the cross-flow discharge flow passage 7 outside the oven 2.

When a sample (fine particles) is separated in the flow-type field-flow fractionation apparatus 1, the first pump 12 and the second pump 15 are operated to form a flow of a mobile phase (carrier fluid) directed from the fluid supply part 11 through the carrier flow passage 4 toward the separation cell 3 and form a flow of a mobile phase (focus fluid) directed from the fluid supply part 11 through the focus flow passage 5 toward the separation cell 3. Further, the sample introduction part 13 is operated to introduce the sample including a plurality of fine particles having various particle sizes into the carrier flow passage 4.

Then, in the separation cell 3 (first cell flow passage 51), a fluid flow directed from one end toward the other end (from left to right in FIG. 1) is formed. Further, as will be described in detail later, in the separation cell 3 (first cell flow passage 51), a flow (cross flow) directed toward a bottom wall (downward) of the separation cell 3 in a thickness direction (vertical direction) of the separation cell 3 is formed.

As a result, the fine particles flow in the separation cell 3 in accordance with the particle size, and the fine particles are separated. Then, the fine particles separated for each particle size flow out to the outflow passage 6 in order, and are detected by the detector 27. The fluid discharged from the outflow passage 6 is collected by the drain 26, and the fluid flowing as the cross flow is collected by the drain 28 via the cross-flow discharge flow passage 7.

2. Electric Configuration of Controller and Members Surrounding Controller

Figure 2:
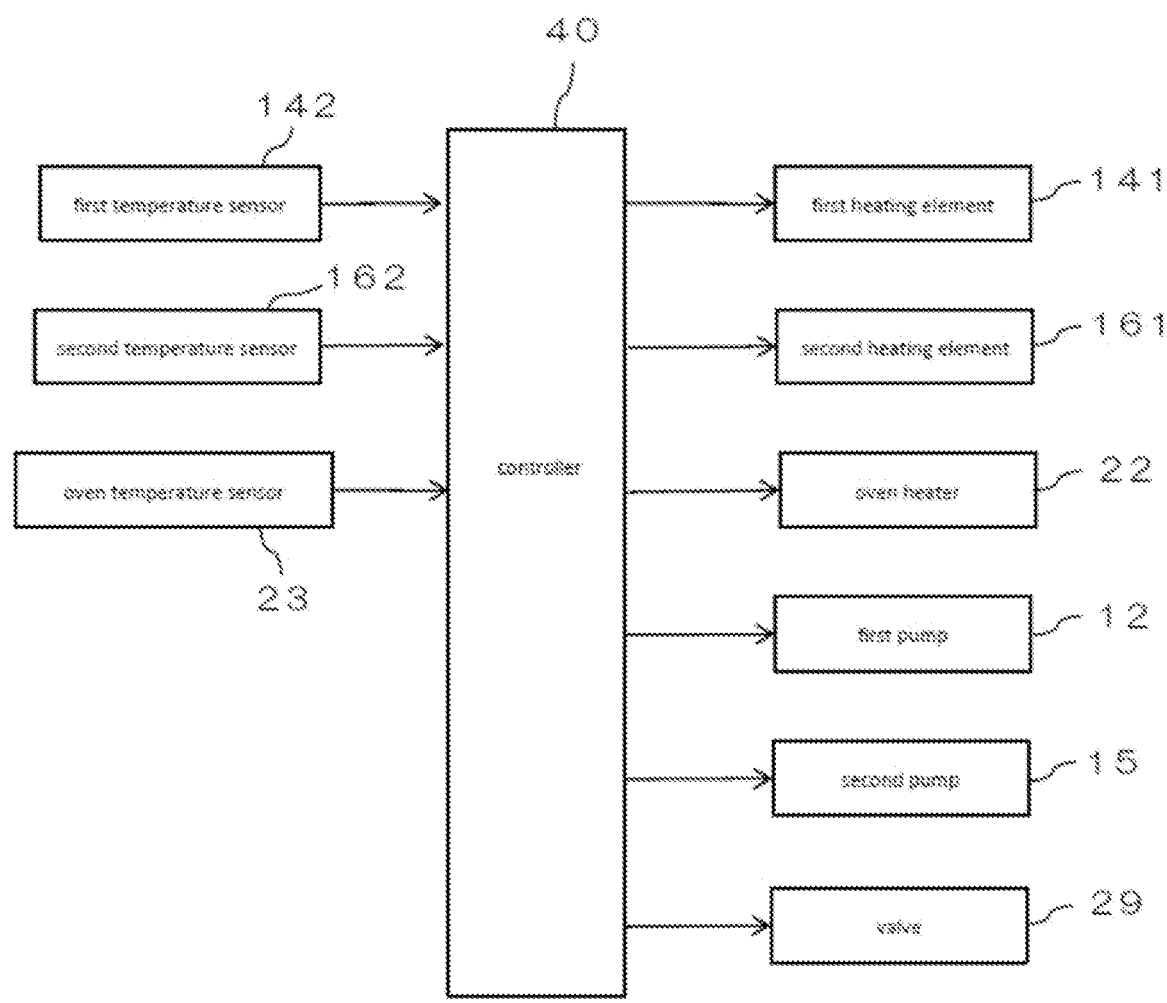
FIG. 2 is a block diagram showing an electric configuration of a controller and members surrounding the controller.

FIG. 2 is a block diagram showing an electric configuration of a controller and members surrounding the controller.

The flow-type field-flow fractionation apparatus 1 includes a controller 40 in addition to the first temperature sensor 142, the second temperature sensor 162, the oven temperature sensor 23, the first heating element 141, the second heating element 161, the oven heater 22, the first pump 12, the second pump 15, and the valve 29 as described above.

The controller 40 includes, for example, a central processing unit (CPU). Parts such as the first temperature sensor 142, the second temperature sensor 162, the oven temperature sensor 23, the first heating element 141, the second heating element 161, the oven heater 22, the first pump 12, the second pump 15, and the valve 29 are electrically connected to the controller 40.

The controller 40 controls energization to (controls turn-on and turn-off of) the first heating element 141 such that the temperature of the first heating element 141 becomes a set temperature on the basis of the temperature of the first heating element 141 detected by the first temperature sensor 142. Further, the controller 40 controls energization to (controls turn-on and turn-off of) the second heating element 161 such that the temperature of the second heating element 161 becomes a set temperature on the basis of the temperature of the second heating element 161 detected by the second temperature sensor 162. Further, the controller 40 controls energization to (controls turn-on and turn-off of) the oven heater 22 such that the temperature inside the housing 21 becomes a set temperature on the basis of the temperature inside the housing 21 detected by the oven temperature sensor 23. Further, the controller 40 appropriately controls operations of the first pump 12, the second pump 15, and the valve 29.

3. Detailed Configuration of Separation Cell

Figure 3:
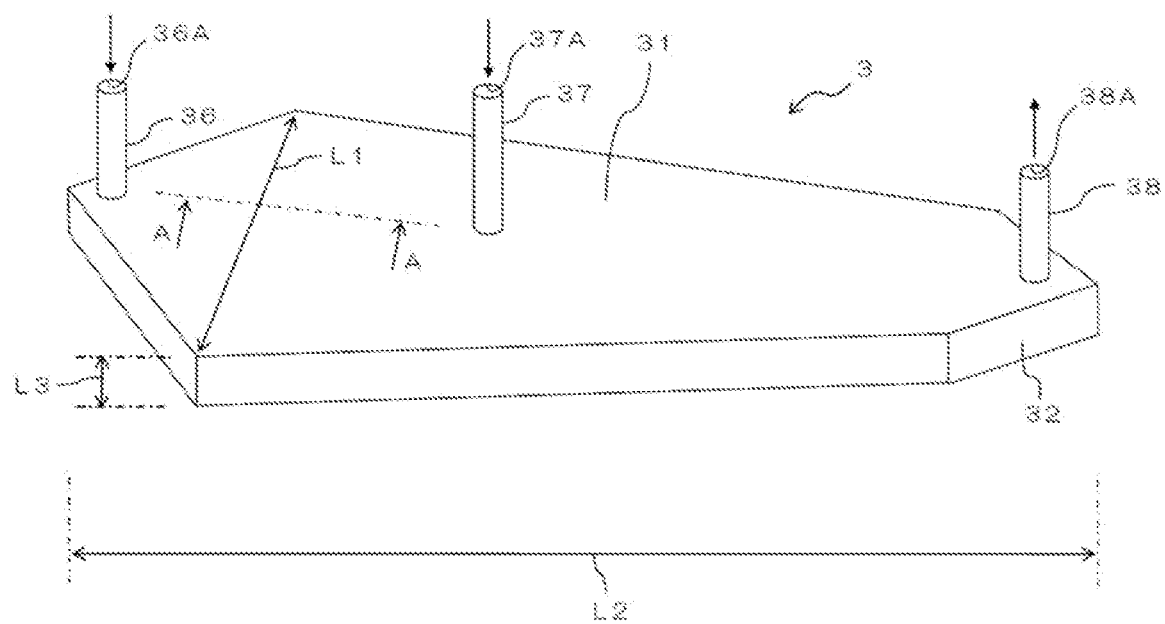
FIG. 3 is a perspective view showing a separation cell in FIG. 1.
Figure 4:
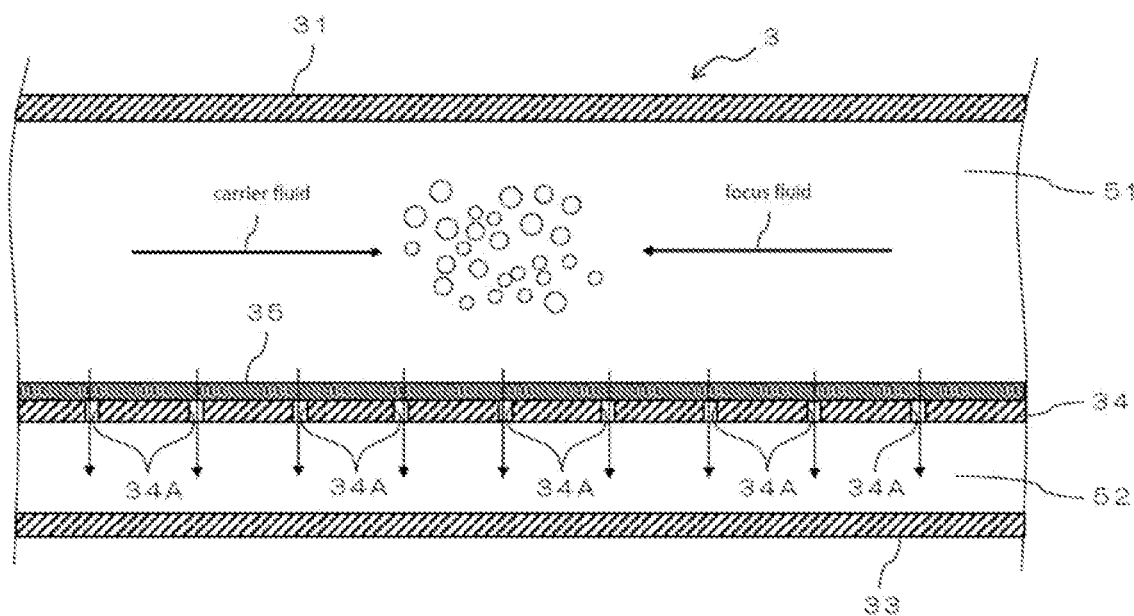
FIG. 4 is a sectional view taken along line A-A in FIG. 3 and shows a state in which fine particles are collected in a flow passage.

FIG. 3 is a perspective view showing the separation cell 3. FIG. 4 is a sectional view taken along line A-A in FIG. 3 and shows a state in which fine particles are collected in the flow passage.

The separation cell 3 is a flat and hollow member having a predetermined thickness, and has a polygonal shape in a plan view. The separation cell 3 includes an upper wall 31, a side wall 32, a bottom wall 33, a support wall 34, and a semipermeable membrane 35. A carrier pipe 36, a focus pipe 37, and an outflow pipe 38 are connected to the separation cell.

The separation cell 3 is a hollow member having an internal space surrounded by the upper wall 31, the side wall 32, and the bottom wall 33. The support wall 34 and the semipermeable membrane 35 are provided in the internal space.

The upper wall 31 configures an upper surface of the separation cell 3. The upper wall 31 has a flat plate shape, and is formed so as to have a long polygonal shape in a plan view. The upper wall 31 is formed so as to taper from one end (eft end in FIG. 3) to the other end (right end in FIG. 3).

The side wall 32 configures a side surface of the separation cell 3.

As shown in FIG. 4, the bottom wall 33 configures a bottom surface of the separation cell 3. The bottom wall 33 is formed in substantially the same shape as the upper wall 31, and is disposed in parallel below the upper wall 31 with a gap.

The support wall 34 is disposed in parallel between the upper wall 31 and the bottom wall 33. The support wall 34 is formed in substantially the same shape as the upper wall 31 and the bottom wall 33. The support wall 34 divides the internal space of the separation cell 3 into two regions, upper and lower. A plurality of openings 34A is formed in the support wall 34.

The semipermeable membrane 35 is provided on (closely adhered to) an upper surface of the support wall 34. The semipermeable membrane 35 is a membrane that allows fluid to pass through and does not allow fine particles to pass through. The plurality of openings 34A in the support wall 34 is covered by the semipermeable membrane 35.

With such a configuration, the separation cell 3 is divided into the first cell flow passage 51 partitioned by the upper wall 31 and the support wall 34 and a second cell flow passage 52 partitioned by the bottom wall 33 and the support wall 34.

As shown in FIG. 3, one end (lower end) of the carrier pipe 36 is connected to one end of the upper wall 31 of the separation cell 3. An internal space in the carrier pipe 36 is continuous with the first cell flow passage 51 formed in the separation cell 3. The other end (upper end) of the carrier pipe 36 is continuous with the carrier flow passage 4 (see FIG. 1). The internal space of the carrier pipe 36 is a carrier inflow port 36A.

One end (lower end) of the focus pipe 37 is connected to a central part of the upper wall 31 of the separation cell 3.

An internal space of the focus pipe 37 is continuous with the first cell flow passage 51 formed in the separation cell 3. The other end (upper end) of the focus pipe 37 is continuous with the focus flow passage 5 (see FIG. 1). The internal space of the focus pipe 37 is a focus inflow port 37A.

One end (lower end) of the outflow pipe 38 is connected to the other end of the upper wall 31 of the separation cell 3. An internal space of the outflow pipe 38 is continuous with the first cell flow passage 51 formed in the separation cell 3. The other end (upper end) of the outflow pipe 38 is continuous with the outflow passage 6 (see FIG. 1). The internal space of the outflow pipe 38 is an outflow port 38A.

Although not shown, the second cell flow passage 52 in the separation cell 3 is continuous with the cross-flow discharge flow passage 7 (see FIG. 1).

A width L1 of the separation cell 3 is, for example, from 10 mm to 20 mm, inclusive. Further, a dimension L2 in a longitudinal direction of the separation cell 3 is, for example, from 100 mm to 300 mm, inclusive. A thickness L3 of the separation cell 3 is, for example, from 0.1 mm to 0.5 mm, inclusive.

4. Operation of Members

When the sample (fine particles) in the flow-type field-flow fractionation apparatus 1 is separated, first, the controller 40 (see FIG. 2) controls the oven heater 22 of the oven 2, the first heating element 141 of the first heater 14, and the second heating element 161 of the second heater 16 so as to become the set temperatures.

Specifically, the controller 40 controls operations of turn-on and turn-off of the oven heater 22 such that the temperature inside the housing 21 becomes the set temperature on the basis of the temperature inside the housing 21 detected by the oven temperature sensor 23. The controller 40 controls operations of turn-on and turn-off of the first heating element 141 such that the temperature of the first heating element 141 becomes the set temperature on the basis of the temperature of the first heating element 141 detected by the first temperature sensor 142. Further, the controller 40 controls operations of turn-on and turn-off of the second heating element 161 such that the temperature of the second heating element 161 becomes the set temperature on the basis of the temperature of the second heating element 161 detected by the second temperature sensor 162.

As a result, the temperature inside the housing 21 of the oven 2 is maintained at the set temperature, and the separation cell 3 is heated to the set temperature. Further, the fluid (carrier fluid) in the carrier flow passage 4 is heated to the set temperature, and the fluid (focus fluid) in the focus flow passage 5 is heated to the set temperature.

The set temperature of the oven heater 22, the set temperature of the first heating element 141, and the set temperature of the second heating element 161 may be different or the same.

Then, the controller 40 operates the first pump 12 and the sample introduction part 13 to introduce the carrier fluid and the fine particles into the first cell flow passage 51 of the separation cell 3 via the carrier inflow port 36A. Further, the controller 40 operates the second pump 15 to introduce the focus fluid into the first cell flow passage 51 of the separation cell 3 via the focus inflow port 37A.

At this time, the separation cell 3 is heated by the oven heater 22. Then, the carrier fluid heated by the first heating element 141 and the focus fluid heated by the second heating element 161 are introduced into the first cell flow passage 51 of the separation cell 3. When the set temperature of the oven heater 22, the set temperature of the first heating element 141, and the set temperature of the second heating element 161 are the same, the separation cell 3, the carrier fluid, and the focus fluid can be maintained at the same temperature, and the temperature in the separation cell 3 can be stabilized.

By introducing the carrier fluid and the focus fluid into the separation cell 3 in this way, as shown in FIG. 4, the fine particles are collected at a part in the first cell flow passage 51. Further, in the separation cell 3, across flow is generated in which the fluid in the first cell flow passage 51 is directed toward the second cell flow passage 52 (downward) through the openings 34A of the support wall 34. A flow rate of the cross flow is adjusted by the controller 40 controlling an opening degree of the valve 29. As a result, a distribution of fine particles according to the particle size occurs in the first cell flow passage 51. Specifically, the distribution of fine particles occurs in such a manner where a particle having a larger particle diameter is located in a lower part of the first cell flow passage 51, and a particle having a smaller particle diameter is located at a center of the first cell flow passage 51.

Figure 5:
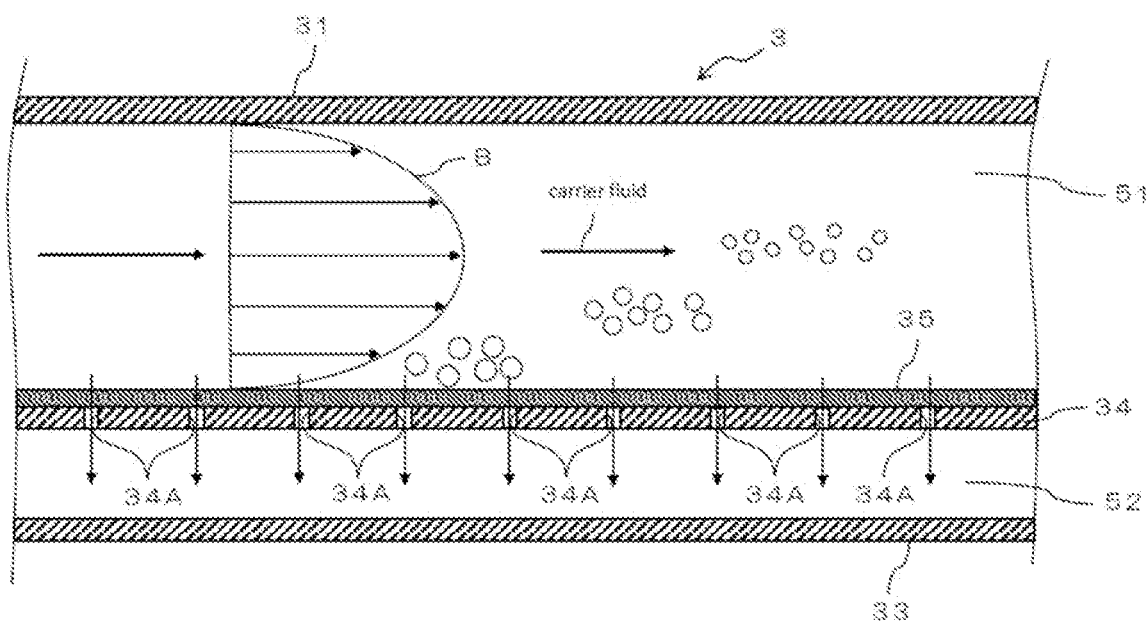
FIG. 5 is a sectional view taken along line A-A in FIG. 3 and shows a state in which fine particles are allowed to flow toward an outflow passage by a carrier fluid.

From this state, a pressure of the first pump 12 and a pressure of the second pump 15 are changed by the controller 40. As a result, as shown in FIG. 5, a flow directed toward the outflow passage 6 (outflow pipe 38) is generated in the first cell flow passage 51. FIG. 5 is a sectional view taken along line A-A in FIG. 3, and shows a state in which the fine particles are allowed to flow toward the outflow passage 6 by the carrier fluid.

In FIG. 5, a flow rate distribution that occurs in the first cell flow passage 51 is represented by B. In the first cell flow passage 51, a viscosity of the carrier fluid causes the flow rate distribution B in which the flow rate is higher at a central part of the first cell flow passage 51. As a result, the particles having a small particle diameter move quickly in the first cell flow passage 51, and the particles having a large particle diameter move slowly in the first cell flow passage 51 to separate the fine particles. Then, the fine particles separated for each particle size flow out to the outflow passage 6 in order, and are detected by the detector 27.

5. Actions and Effects (1) In the present embodiment, as shown in FIG. 1, the flow-type field-flow fractionation apparatus 1 includes the first heater 14 and the second heater 16. The first heater 14 heats the carrier fluid between the first pump 12 and the separation cell 3. The second heater 16 heats the focus fluid between the second pump 15 and the separation cell 3.

Thus, the carrier fluid heated by the first heater 14 is sent by the first pump 12 and flows into the separation cell 3, and the focus fluid heated by the second heater 16 is sent by the second pump 15 and flows into the separation cell 3.

This can stabilize the temperatures of the carrier fluid and the focus fluid in the separation cell 3. Then, when an analysis is performed using the flow-type field-flow fractionation apparatus 1, the analysis can be performed with high reproducibility. In particular, the flow-type field-flow fractionation apparatus 1 has characteristics that temperature control is difficult because a flow rate of each fluid changes greatly when both the carrier fluid and the focus fluid are introduced (see FIG. 4) and when only the carrier fluid is introduced (see FIG. 5). However, the present embodiment allows the temperature of each fluid to be suitably stabilized.

(2) Further, in the present embodiment, in the flow-type field-flow fractionation apparatus 1, the first heater 14 heats the carrier fluid to the set temperature, and the second heater 16 heats the focus fluid to the set temperature.

This allows the carrier fluid and the focus fluid maintained at a constant temperature to flow into the separation cell 3.

As a result, the temperature of the fluid in the separation cell 3 can be further stabilized.

(3) Further, in the present embodiment, as shown in FIG. 1, the flow-type field-flow fractionation apparatus 1 includes the oven 2. The oven 2 houses the separation cell 3 inside the oven 2 and heats the separation cell 3.

In this way, heating the separation cell 3 with the oven 2 can stabilize the temperature of the separation cell 3.

This can stabilize the temperatures of the carrier fluid and the focus fluid that have flowed into the separation cell 3.

(4) Further, in the present embodiment, the first heater 14 includes the first heating element 141. The second heater 16 includes the second heating element 161. The first heating element 141 heats the carrier fluid, and the second heating element 161 heats the focus fluid.

The carrier fluid can be therefore directly heated by the first heating element 141. Further, the focus fluid can be directly heated by the second heating element 161. As a result, the temperatures of the carrier fluid and the focus fluid can be smoothly adjusted.

6. Second Embodiment

Hereinafter, a flow-type field-flow fractionation apparatus according to another embodiment of the present invention will be described with reference to FIGS. 6 and 7. The same configuration and method as in the first embodiment will be omitted by using the same reference signs and the like as described above.

Figure 6:
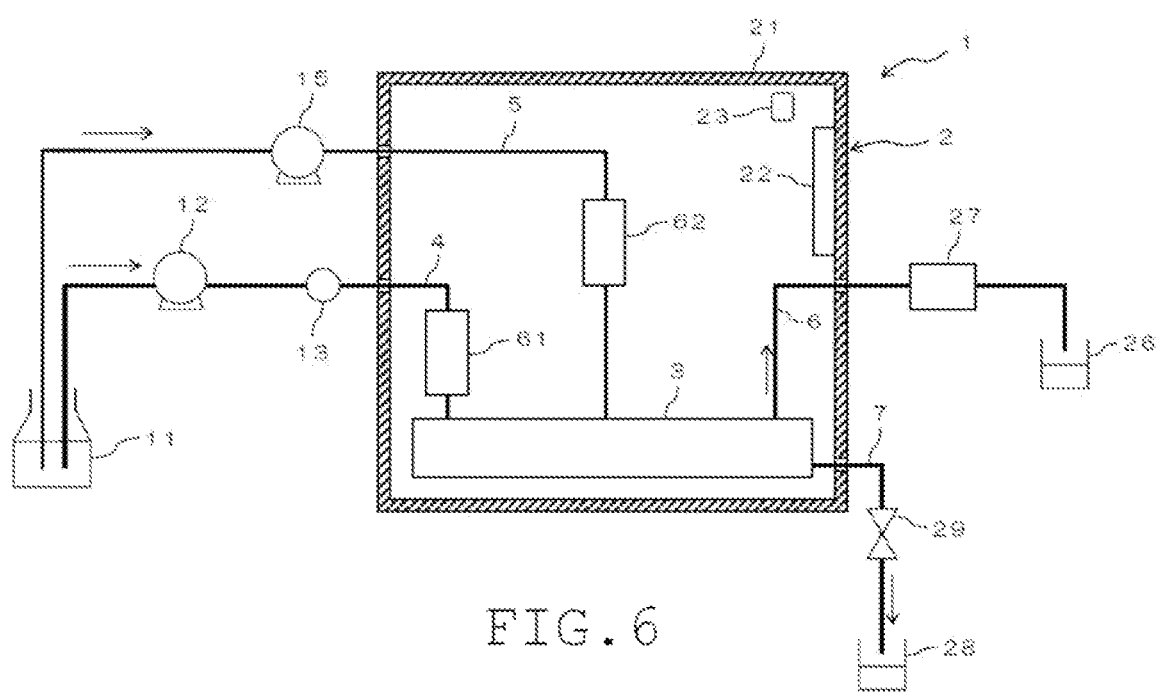
FIG. 6 is a schematic diagram showing a configuration example of a flow-type field-flow fractionation apparatus according to a second embodiment of the present invention.

FIG. 6 is a schematic diagram showing a configuration example of the flow-type field-flow fractionation apparatus 1 according to a second embodiment of the present invention.

In the second embodiment, a first heat transfer element 61 is provided in place of the first heater 14, and a second heat transfer element 62 is provided in place of the second heater 16.

The first heat transfer element 61 is a heat block configured by a material having high thermal conductivity such as aluminum. The first heat transfer element 61 is disposed (interposed) in the intermediate part of the carrier flow passage 4 inside the oven 2. Specifically, the first heat transfer element 61 covers the intermediate part of the carrier flow passage 4 between the separation cell 3 and the first pump 12.

The second heat transfer element 62 is a heat block configured by a material having high thermal conductivity such as aluminum. The second heat transfer element 62 is disposed (interposed) in the intermediate part of the focus flow passage 5 inside the oven 2. Specifically, the second heat transfer element 62 covers the intermediate part of the focus flow passage 5 between the separation cell 3 and the second pump 15.

In the flow-type field-flow fractionation apparatus 1 according to the second embodiment, when the oven heater 22 is operated, the first heat transfer element 61 and the second heat transfer element 62 are heated by heat from the oven heater 22. Then, the carrier fluid in the carrier flow passage 4 is heated by the heated first heat transfer element 61. Further, the focus fluid in the focus flow passage 5 is heated by the heated second heat transfer element 62.

As described above, in the second embodiment, the first heat transfer element 61 transfers the heat from the oven heater 22 of the oven 2 to the carrier fluid. Further, the second heat transfer element 62 transfers the heat from the oven heater 22 of the oven 2 to the focus fluid.

Therefore, in the flow-type field-flow fractionation apparatus 1, the carrier fluid and the focus fluid can be heated by using the heat in the oven without providing a heating element that directly heats the carrier fluid and the focus fluid.

7. Third Embodiment

Figure 7:
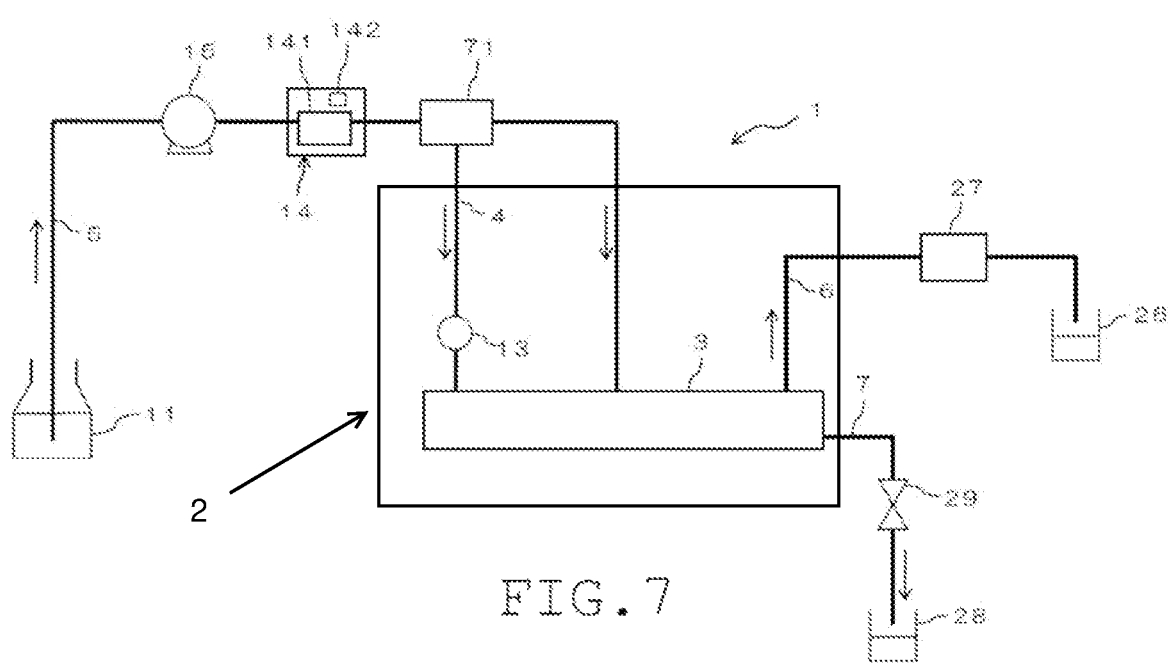
FIG. 7 is a schematic diagram showing a configuration example of a flow-type field-flow fractionation apparatus according to a third embodiment of the present invention.

FIG. 7 is a schematic diagram showing a configuration example of the flow-type field-flow fractionation apparatus 1 according to a third embodiment of the present invention.

In the third embodiment, the flow-type field-flow fractionation apparatus 1 is not provided with the oven 2 and the second heater 16 described above. Further, the other end of the carrier flow passage 4 is connected to the intermediate part of the focus flow passage 5. A splitter 71 is provided at a confluence of the carrier flow passage 4 and the focus flow passage 5. The first heater 14 is disposed (interposed) between the splitter 71 and the second pump 15 in the intermediate part of the focus flow passage 5.

The splitter 71 includes a valve (not shown), and by adjusting the opening degree of this valve, the flow rate of the carrier fluid flowing from the carrier flow passage 4 into the separation cell 3 and the flow rate of the focus fluid flowing from the focus flow passage 5 into the separation cell 3 are adjusted.

In the flow-type field-flow fractionation apparatus 1 according to the third embodiment, the first heater 14 heats the intermediate part of the focus flow passage 5 between the splitter 71 and the second pump 15. Then, a part of the heated fluid flows from the carrier flow passage 4 to one end of the separation cell 3 via the splitter 71. Further, the rest of the heated fluid passes through the splitter 71, then directly passes through the focus flow passage 5, and flows into the central part of the separation cell 3.

Thus, in the third embodiment, the fluid is heated by one first heater 14. Then, the heated fluid flows into the separation cell 3 as a carrier fluid and a focus via the splitter 71.

Therefore, a simple configuration can be achieved in the flow-type field-flow fractionation apparatus 1.

In the third embodiment, the flow-type field-flow fractionation apparatus 1 has a configuration in which the oven 2 is omitted, but the oven 2 may be used to heat the separation cell 3 without omitting the oven 2. The oven 2 can be omitted when ambient temperature of the separation cell 3 is stable, but the oven 2 is preferably provided in an environment where the ambient temperature is not stable.

8. Modification

In the above embodiment, it has been described that the separation cell 3 is formed so as to taper from one end to the other end. However, the separation cell 3 may have a shape extending from one end to the other end while keeping the same width.

Further, in the above embodiment, it has been described that the cross flow is directed only toward the bottom wall 33 of the separation cell 3. However, the cross flow may be directed toward both the upper wall 31 and the bottom wall 33 of the separation cell 3.

DESCRIPTION OF REFERENCE SIGNS 1 flow-type field-flow fractionation apparatus
2 oven 3 separation cell
12 first pump
14 first heater
15 second pump
16 second heater
34 support wall
34A opening
36A carrier inflow port
37A focus inflow port
38A outflow port
141 first heating element
161 second heating element

The invention claimed is:

1. A flow-type field-flow fractionation apparatus comprising:
- a separation cell provided inside with a flow passage for a fluid, the cell having a carrier inflow port allowing a carrier fluid to flow into the flow passage, a focus inflow port allowing a focus fluid to flow into the flow passage, an outflow port allowing the carrier fluid that has passed through the flow passage to flow out, and a plurality of openings allowing a part of the carrier fluid to discharge to outside as a cross flow;
- at least one pump configured to send the carrier fluid and the focus fluid to the separation cell;
- a first heater configured to heat the carrier fluid and/or the focus fluid between the at least one pump and the separation cell, the first heater having a first set temperature; and
- an oven that houses the separation cell inside the oven, the oven configured to function as a second heater different from the first heater to heat the separation cell, the oven having a second set temperature, the oven having an inner area to accommodate the first heater therein,
- wherein the first and second set temperatures are the same with each other.

2. The flow-type field-flow fractionation apparatus according to claim 1, wherein the first heater is configured to have a heating element that heats the carrier fluid and/or the focus fluid.

3. The flow-type field-flow fractionation apparatus according to claim 1, wherein the first heater is configured to have a heat transfer element that transfers heat in the oven to the carrier fluid or the focus fluid.

4. The flow-type field-flow fractionation apparatus according to claim 1, further comprising a focus flow passage connected to the focus inflow port,
wherein the first heater is interposed in an intermediate part of the focus flow passage.

* * * * *